J. SPRATT.
Preparing Teas for Use.

No. 147,877.                          Patented Feb. 24, 1874.

WITNESSES:

INVENTOR:
BY
ATTORNEYS.

UNITED STATES PATENT OFFICE.

JAMES SPRATT, OF THE ISLAND OF GUERNSEY.

IMPROVEMENT IN PREPARING TEAS FOR USE.

Specification forming part of Letters Patent No. 147,877, dated February 24, 1874; application filed December 29, 1873.

*To all whom it may concern:*

Figure 1:
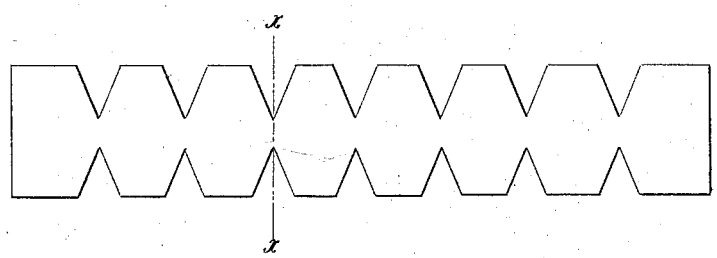
Figure 2:
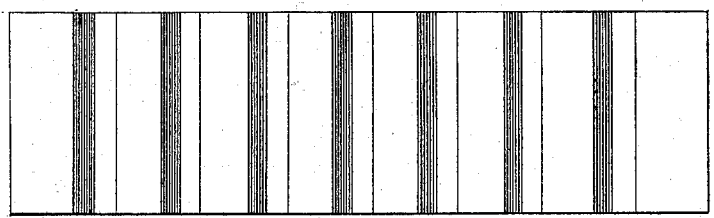
Figure 3:
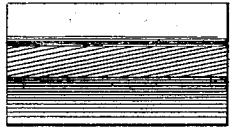

Be it known that I, JAMES SPRATT, formerly of London, England, and now residing in the Island of Guernsey, have invented a new and useful Improvement in Solidified Tea, of which the following is a specification:

Figure 1 is an edge view of a block of my solidified tea. Fig. 2 is a side view of the same. Fig. 3 is a cross-section of the same.

Similar letters of reference indicate corresponding parts.

My invention has for its object to furnish for the retail trade tea compressed into solid blocks of convenient shape and size, so formed that the quantity required for use at a time may be readily separated from the block, and which will not crumble or lose its strength or flavor, however long it may be kept. The invention consists in the mode of treating tea herein set forth—that is to say, by compressing it into solid blocks of convenient size, and either with or without the transverse V-shaped grooves, and in the V-shaped transverse grooves formed in the opposite sides of the compressed blocks of tea, as hereinafter fully described.

The tea to be solidified or compressed is placed in molds of iron or other material possessing the requisite strength, when it is subjected to such a pressure as will reduce it to one-third its former bulk, which pressure will reduce the tea to a cake or block, A, which shall have a smooth glossy surface, and will not crumble. This pressure breaks up the cells or sacks of the tea, so that the strength and flavor in making a decoction can be more thoroughly and much more quickly extracted than is possible when the ordinary loose tea is used. The bottom of the mold and of the follower are provided with V-shaped transverse projections, which enter the tea, and, as the pressure is applied, they pack it more closely, and leave deep transverse grooves $a'$ in the upper and lower sides of the blocks A. The grooves $a'$ upon the opposite sides of the block A should be opposite each other, as shown in Fig. 1, so that one or more of the sections formed by the grooves $a'$ may be broken off, according to the quantity required to be used at a time. A hydraulic press, a steam-hammer, a screw, lever, cam, roller, or other power may be used for applying the pressure, as may be convenient. A pressure of from forty to one hundred tons to the square inch, more or less, according to the quantity to be acted upon at a time, is required to secure perfect crushing and solidifying, producing a glazed, hard surface, and preventing the crumbling of the blocks, and the breaking off of the corners and edges.

Having thus described my invention, I claim as new and desire to secure by Letters Patent—

1. As a new article of manufacture or commerce, a block of solidified or compressed tea, as herein set forth.

2. As a new article of manufacture, a block of compressed tea provided with transverse grooves, substantially as herein shown and described.

JAMES SPRATT.

Witnesses:
    GEORGIA BRENTON VON DONOP,
    HARRIET L. GUILBERT.